United States Patent [19]

van der Velden

[11] 4,147,385
[45] Apr. 3, 1979

[54] COUPLING SLEEVE

[75] Inventor: Johannes H. van der Velden, Seattle, Wash.

[73] Assignee: The Boeing Company, Seattle, Wash.

[21] Appl. No.: 628,664

[22] Filed: Nov. 4, 1975

Related U.S. Application Data

[63] Continuation-in-part of Ser. No. 476,854, Jun. 6, 1974, abandoned.

[51] Int. Cl.² ............................................. F16L 13/14
[52] U.S. Cl. ..................................... 285/382.4; 29/523
[58] Field of Search ...................... 285/382, 382.4, 341, 285/222, 256, 258; 29/523

[56] References Cited

U.S. PATENT DOCUMENTS

| | | | |
|---|---|---|---|
| 3,484,123 | 12/1969 | van der Velden | 285/341 |
| 3,584,903 | 6/1971 | Pritchard | 285/382.4 |
| 3,711,132 | 1/1973 | Nickerson | 285/382.4 |
| 3,730,567 | 5/1973 | Webster | 285/382.4 |

FOREIGN PATENT DOCUMENTS

| | | | |
|---|---|---|---|
| 680620 | 1/1965 | Italy | 285/382.4 |
| 8180 of | 1906 | United Kingdom | 285/382.4 |

Primary Examiner—Dave W. Arola
Attorney, Agent, or Firm—Christie, Parker & Hale

[57] ABSTRACT

A two-groove coupling sleeve for swaged attachment to thin wall tubing. The sleeve is a cylindrical body having a pair of spaced apart annular grooves provided in the inner peripheral wall, the dimensions of the innermost groove conforming to certain relationships with respect to tube wall thickness. The width (W) of the innermost groove is related to the wall thickness (T) of the tubing to which it is to be swaged, according to the relationship, W/T is equal to or greater than 2.2 and the width generally increases with increasing tube wall thickness. A groove depth for the innermost groove is specified for providing a predetermined amount of tube wall deflection in the region of the groove. The sharpness of the grooves is also defined to assure proper tensile strength and sealing capability.

7 Claims, 4 Drawing Figures

COUPLING SLEEVE

REFERENCE TO RELATED APPLICATION

This is a continuation-in-part of application Ser. No. 476,854, filed June 6, 1974 and now abandoned.

DESCRIPTION OF THE PRIOR ART

The present invention relates to an improved coupling sleeve for rigid attachment to thin wall tubing and in particular to a sleeve having an interior configuration such that it can be swaged to such tubing in a pressure tight relationship while satisfying all mechanical and performance requirements for such swaged joints.

In many applications of hydraulic systems such as used in aircraft and aerospace applications, the end fittings for the tubing in such systems are MS flareless fittings with swaged on sleeves. Such sleeves have been characterized by two or three internal annular grooves and were developed for use with light weight, thin wall, hydraulic tubing to eliminate the leakage and inadequate tensile joint strength problems encountered with bite type sleeves such as described in U.S. Government Specification MIL-F-18280. Embodiments of the two and three groove sleeves of this type are illustrated and described in U.S. Pat. Nos. 3,484,123 and 3,730,567. The sleeve in the latter patent is characterized by an annular land between the grooves having a diametrical measurement intermediate of the grooves and inner wall of the sleeve. With respect to the various embodiments of the sleeves shown in the aforementioned patents, use and operating experience have indicated the direction for improvements.

In the case of the three groove configuration, several operational problems have been encountered, including damage to swaging equipment due to operation at upper limit swaging pressure levels. Such damage manifests itself in reduced tooling life and tool failure, as well as damage to sleeves and tubing due to the use of high operating pressures to achieve satisfactory joint strength.

In the case of the two groove sleeve, it has been determined that when used with certain tubing materials the tensile strength of the joint formed is reduced below acceptable levels in comparison to industry standard requirements.

The present invention provides a sleeve having universal application as a suitable member for swaged attachment to tubing characterized by operational improvements, including a significant reduction in swaging pressures and commensurate relaxation in demands on swaging equipment while satisfying all standard requirements for joint strength and integrity. The sleeve is characterized by a pair of grooves provided in the inner peripheral wall of the sleeve adjacent one end thereof wherein the width of the interior groove bears a specific dimensional relationship to the thickness of the tube to which it is to be swaged.

In one aspect, the invention provides a coupling sleeve for swaged attachment to thin wall tubing consisting essentially of a cylindrical body having a tube end, a body end, and an inner peripheral wall with the inner peripheral wall having a first diameter. A first annular groove is located in the inner wall adjacent the tube end of the sleeve, the groove having a second diameter greater than said first diameter. A second annular groove is located in the inner wall interiorly of the first groove, said second groove having a width dimension (W) related to the thickness dimension (T) of the wall of the tubing to which the sleeve is to be attached according to the relationships that the width dimension (W) generally increases as the thickness dimension (T) increases and the ratio W/T is maintained such that the ratio is equal to or greater than 2.2. An annular land having a width dimension which is equal to or greater than $\frac{1}{4}$ of the width of the second groove is located in the inner wall of the body separating said first and second annular grooves having a diameter equal to the diameter of the inner peripheral wall of the cylindrical body.

In another aspect the invention provides a tube coupling assembly in which a coupling sleeve is attached to thin wall tubing by means of swaging consisting of a tube member of varying diameterical sizes having a tube wall thickness of less than 1/10 of an inch. A sleeve member of a predetermined length is disposed about and affixed to the tube member, the sleeve member consisting of a cylindrical body having a tube end, a body end, and an inner peripheral wall having a first diameter. A first annular groove is located in the inner wall of the body adjacent the tube end of the sleeve and has a second diameter greater than said first diameter and a width dimension ($W_1$). A second annular groove is located interiorly of said first groove and has a third diameter greater than said second diameter, said second groove having a width dimension ($W_2$) related to the thickness dimension (T) of the tube wall to which the sleeve is attached according to the relationships that the width dimension ($W_2$) generally increases as the thickness dimension (T) increases and the ratio ($W_2/T$) is maintained such that it is equal to or greater than 2.2. An annular land is located between said first and second grooves having a diameter equal to said first diameter; and a raised portion is located on the exterior peripheral wall defining a pair of oppositely facing abutment surfaces intermediate the ends of the sleeve.

In comparison to the prior art sleeves, what results from the present invention is a sleeve wherein the operational problems encountered in swaging are minimized by a reduction in swaging pressures of at least 15%. Such reductions significantly reduce strain on all aspects of the swaging equipment, producing greatly increased tool life and added safety due to reduction or elimination of tool breakage in operation. All of the foregoing is accomplished while still producing swaged joints satisfying performance requirements in all aspects. The sleeve of the present invention is suited for use with all types of tubing material including steel, aluminum, and titanium while still retaining the operational benefits outlined above.

DESCRIPTION OF THE DRAWINGS

The foregoing and other details of the invention will be better understood by reference to the drawings, wherein.

DESCRIPTION OF A SPECIFIC EMBODIMENT

Figure 1:
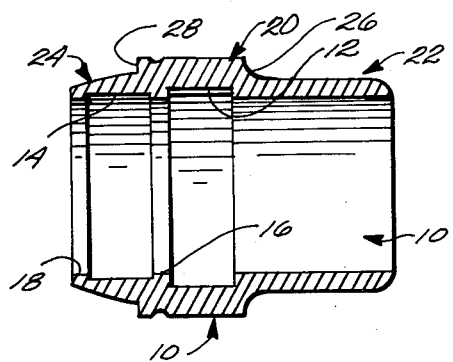
FIG. 1 is a sectional view of a sleeve according to the present invention.

A sleeve 10 according to the present invention is shown in FIG. 1, in section view. As shown therein, the sleeve comprises an innermost groove 12 and a second groove 14 located adjacent the opening at the tube end of sleeve 10 on the exterior side of groove 12. As shown in FIG. 1 and illustrated in more detail in FIG. 2 groove 12 has a depth which is approximately 50% greater than the depth of groove 14. As will be discussed in greater detail herein, the width of groove 12 is directly related to the thickness of the tubing (not shown) to which this sleeve 10 is to be attached by swaged engagement and to the width of groove 14. The depth of groove 12 is also specified according to the requirements of the present invention.

Located intermediate the grooves 12 and 14 is an annular land 16 having the same diametrical dimension as the inner diametrical measurement of the sleeve. A lip 18 located on the exterior side of groove 14 defines the tube end of the sleeve and has the same diameter and width dimensions as land 16.

Provided on the exterior peripheral surface of the sleeve 10 is a raised central section 20 located intermediate tube portions 22, 24. End portions 22 and 24 are each of a diameter less than the diameter of central section 20 and are integrally formed therewith to define at the respective points of juncture a first and second shoulder 26 and 28 facing in opposite directions from central section 20. Shoulders 26 and 28 provide abutment surfaces for the swaging equipment when the sleeve is being attached to the tubing and for other elements of the coupling assembly when coupled into a union or joint.

Figure 2:
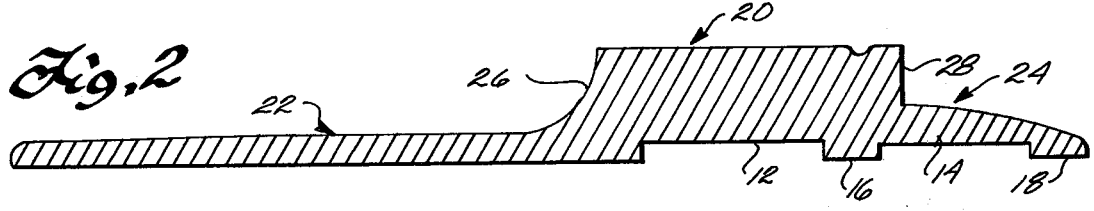
FIG. 2 is an enlargement of a portion of the sectional view of FIG. 1 illustrating in greater detail the dimensional relationships of the grooves and lands in the inner peripheral wall of the sleeve.
Figure 3:
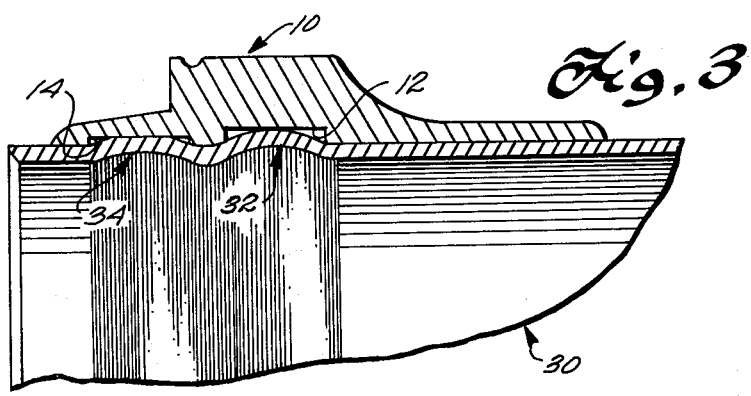
FIG. 3 is a sectional view of a portion of a joint wherein the sleeve of the present invention is swaged to thin wall flareless tubing.

The relative widths and depths of the two inner peripheral grooves 12, 14 are better illustrated in the enlarged view of FIG. 2 while the relationships of sleeve and tubing wall in the swaged condition is shown in FIG. 3 As indicated previously, the width and depth of the groove 12 bears a specific relationship to the thickness of the tubing wall to which it is to be swaged.

The relationships are illustrated in the accompanying table for typical thin wall tubing such as 21-6-9 CRES (cold rolled steel) tubing and the sleeve according to the present invention. As shown therein, the width $W_2$ of groove 12 (identified as the interior groove) to the thickness dimension (T) of the tube wall has a ratio of approximately 2.2 or greater. The depth of inner groove 12 is selected such that the deflection of the tube wall is 0.010 inches or greater. Related to the thickness of the tube wall, a minimum ratio for groove depth to wall thickness of approximately 0.30 is indicated for tubing having relatively thick walls ranging to a ratio of 0.75 to the thinnest tube wall.

As shown in the table, the width dimension of both grooves generally increases as tube wall thickness increases. In known prior art sleeves the width dimensions of the grooves remained constant regardless of tube wall thickness. In contrast with prior art sleeves the width of land 16 is increased by approximately 25% relative to known prior art sleeves providing a land to second groove width ratio of ¼ or greater.

| DIMENSIONAL RELATIONSHIPS - SLEEVE AND TYPICAL THIN WALL STEEL TUBING | | | | | | | | | | | | |
|---|---|---|---|---|---|---|---|---|---|---|---|---|
| Tube Size | Tube Wall Thickness | Land Width | Interior Groove Width $W_2$ | Exterior Groove Width $W_1$ | Interior Groove Depth $D_1$ | Exterior Groove Depth $D_2$ | Minimum Deflection | $W_2/T$ Max. | $W_2/T$ Avg. | $W_2/T$ Min. | $W_1/W_2$ | $D_1/T$ |
| -04 | .016 in. | .115 in. | .115 in. | .115 in. | .012 in. | .008 in. | .010 in. | 8.7 | 7.2 | 5.9 | 1 | .75 |
| -05 | .020 | .040 | .115 | .115 | .012 | .008 | .010 | 6.9 | 5.75 | 4.8 | 1 | .6 |
| -06 | .020 | .040 | .125 | .125 | .012 | .008 | .010 | 7.5 | 6.24 | 5.2 | 1 | .6 |
| -08 | .026 | .040 | .130 | .130 | .010 | .008 | .010 | 6.0 | 5.0 | 4.2 | 1 | .46 |
| -10 | .033 | .040 | .142 | .143 | .013 | .008 | .011 | 5.1 | 4.3 | 3.6 | 1 | .39 |
| -12 | .039 | .040 | .135 | .115 | .015 | .010 | .012 | 4.1 | 3.46 | 2.9 | 0.85 | .38 |
| -16 | .052 | .040 | .135 | .115 | .016 | .010 | .013 | 3.0 | 2.6 | 2.2 | 0.85 | .31 |

The width of groove 14 (indentified as the exterior groove) is selected such that its is approximately equal to the width of groove 12. This latter relationship is observed except in the situation where the thinning of sleeve material adjacent the tube end thereof tends to weaken the structural integrity of the sleeve requiring some departure from the optimum relationship resulting in a ratio of $W_1/W_2$ approximately 0.85. The depth of groove 14 in relation to the depth of groove 12 is such that the two dimensions have a ratio of approximately 2:3. Testing of joints utilizing two groove sleeves conforming to the foregoing relationships have demonstrated that joints of strength and integrity conforming to or exceeding standards and prior art performance are obtained.

In FIG. 3, a section of thin wall tubing 30 is shown in its swaged condition with respect to the sleeve 10 and as shown therein portions 32 and 34 of the tubing wall are deformed in an annular pattern outwardly such that said portions of the tubing wall extend into and substantially fill the annular cavities defined by the grooves 12 and 14 of the sleeve. This deformation is accomplished by application of pressure at the tube inner wall which forces the tube material to expand outwardly into the grooves of the sleeve. In one embodiment of a swaging operation, an elastomeric bushing is caused to expand against the tube inner wall to force the tube materials into the groove. This is accomplished by exerting an axial force on a draw bolt on which the bushing is mounted which in turn exerts pressure on the elastomeric material in the axial direction, causing it to compress and expand in a radial direction thereby exerting the required swaging force.

Figure 4:
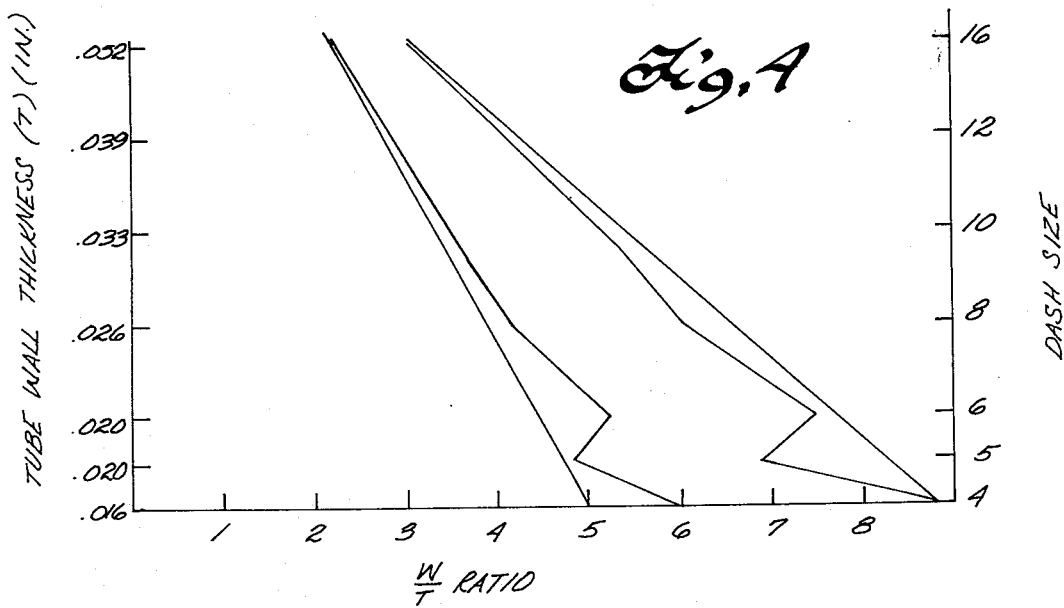
FIG. 4 is a graph illustrating the relationship of the groove width to tube wall thickness for the sizes of tubing for which the present invention is applicable.

The graph of FIG. 4 illustrates the maximum and minimum thickness relationship for a sleeve and tubing of 21-6-9 CRES tubing material and plots a portion of the data set forth in the preceding table.

In the presently preferred embodiment the grooves and lands of the sleeve have a configuration such that in cross section adjacent surfaces are perpendicular to each other with the corners thereof being essentially sharp right angles. The right circular cylinder angularity of the surfaces defining the lands and grooves provides the means whereby the lands, particularly, engage the walls of the tubing in the regions cf deflections to provide sound, reliable, and pressure tight seals upon application of proper swaging forces by the swaging equipment. The sharpness of the edges of the grooves is limited to a maximum permissible radius of 0.002 inches in order to insure proper tensile strength and sealing capability of the sleeve to tube swaged connection.

What is claimed is:

1. A coupling sleeve for swaged attachment to thin wall tubing consisting essentially of a cylindrical body having a tube end, a body end, and an inner peripheral wall, said inner peripheral wall having a first diameter, a first annular right circular cylindrical groove located in the inner wall adjacent the tube end of the sleeve having a second diameter greater than said first diameter, said first groove being rectangular in cross-section;

a second annular right circular cylindrical groove located in the inner wall interior of the first groove, said second groove having a rectangular cross-section and in addition having a width dimension (W) related to the thickness dimension (T) of the wall of the tubing to which the sleeve is to be attached according to the relationships:

| T | W |
| --- | --- |
| .016 in. | .115 in. |
| .020 in. | .115 in. |
| .020 in. | .125 in. |
| .026 in. | .130 in. |
| .033 in. | .142 in. |

-continued

| T. | W |
| --- | --- |
| .039 in. | .135 in. |
| .052 in. | .135 in. | and the ratio of W/T is maintained such that the ratio is equal to or greater than 2.2; and an annular right circular land located in the inner wall of the body separating said first and second annular grooves having a width dimension which is equal to or greater than ¼ of the width of the second groove and a diameter equal to the diameter of the inner peripheral wall of the cylindrical body.

2. A sleeve according to claim 1 wherein the second groove has a predetermined minimum depth such that an outward deflection of at least 0.010 inches of the tubing wall into said groove is produced upon swaging.

3. A sleeve according to claim 1 wherein the width of said first and second grooves are approximately equal.

4. A sleeve according to claim 1 wherein a lip defines the tube end of the sleeve, said lip being an annular land having a diameter equal to the diameter of the inner peripheral wall of the cylindrical body.

5. A sleeve according to claim 1 wherein the width of said lip is equal to the width of said land between the first and second groove.

6. A sleeve according to claim 1 wherein the depth of said first groove is approximately ⅔ the depth of said second groove.

7. A sleeve according to claim 1 wherein the maximum permissible radius of the edges of each of the grooves is 0.002 inches.

* * * * *